XR 3,550,828

United States [11] 3,550,828

[72] Inventor James P. Watson
Jupiter, Fla.
[21] Appl. No. 755,100
[22] Filed Aug. 26, 1968
[45] Patented Dec. 29, 1970
[73] Assignee RCA Corporation
a corporation of Delaware

[54] TAPE LEVEL SENSOR
6 Claims, 3 Drawing Figs.

[52] U.S. Cl. .......... 226/30, 73/70.2; 226/45; 310/8.8; 73/88.5
[51] Int. Cl. .......... B65h 23/18
[50] Field of Search .......... 73/70.2, 194, 88.5; 324/109; 226/29, 30, 42, 45, 118, 97; 242/185; 310/8.8

[56] References Cited
UNITED STATES PATENTS

| | | | |
|---|---|---|---|
| 3,027,059 | 3/1962 | Streeter .......... | 226/118X |
| 3,124,317 | 3/1964 | Gilson .......... | 226/118X |
| 3,365,593 | 1/1968 | Roof .......... | 310/8.8X |

*Primary Examiner*—Richard A. Schacher
*Attorney*—H. Christoffersen

ABSTRACT: A tape storage apparatus having an open ended receptacle using vacuum to retain a loop of tape therein. Sensors mounted on a wall of the receptacle produce electrical signals representative of the position of the tape loop in the receptacle by a vibration of one end of a leaf spring which overlies a pad of self-polarized material located on a surface of the wall of the receptacle. The other end of the leaf spring projects into an air path from the inside of the receptacle to a vacuum source to produce the vibration of the leaf spring when the air path is free of the tape loop.

3550828
OR In 226/30

PATENTED DEC 29 1970 3,550,828

INVENTOR
JAMES P. WATSON
BY H. Christoffersen
ATTORNEY

TAPE LEVEL SENSOR

CROSS REFERENCE

Subject matter herein but not specifically claimed, is shown and claimed in a copending application of James P. Watson, having Ser. No. 723,442, filed on Apr. 23, 1968.

BACKGROUND OF THE INVENTION

In a recording tape transport system, it is customary to drive a recording tape across a recording and/or playback station to cause information to be recorded on or read from the tape, respectively. The tape is driven between a takeup reel and a supply real by a drive system which controls the speed and direction of the tape. Conventional high-speed tape transports use loop boxes, or receptacles, for storing on extended loop, or bight, of the tape These tape boxes are usually located on both sides of the recording and playback station. The purpose of these loop boxes is to provide slack loops of tape which are used by the tape transport system to compensate the tape station for sudden speed variations, i.e., changes in tape speed, occasioned by the drive system and external transient factors.

While it may be desirable to have long lengths of tape in the tape receptacles for providing a maximum cushioning effect against the aforesaid speed variations, this goal must be balanced against a concurrent need for rapid tape acceleration from a stationary condition to a running speed. In order to achieve this maximum acceleration, it is desirable to have a minimum weight, or length, of tape loop in the tape receptacles in order to minimize the inertia of the length of tape between the aforesaid storage reels which must be moved during the acceleration period. Thus, the conflicting demands of a stable and responsive tape drive system are generally met by maintaining the tape loop in the tape receptacles between a minimum and a maximum length in order to satisfy both requirements.

In the conventional tape systems, the tape receptacles are operated by means of an internal vacuum which draws the tape into the receptacle. Within the tape receptacle, the length of the tape is maintained within the aforesaid length limits by sensors which provide signals representative of the length of the tape loop. These sensors have usually been optical devices using the tape loop as a shutter between a photocell and a light source located on opposite sides of the receptacle to generate a signal from the photocell representative of the position of the tape loop. Such optical sensors have exhibited several operational problems including fatigue life of the light source and photocell and operational instability due to dust accumulations. Accordingly, it is an object of the present invention to provide a tape receptacle having loop sensors which exhibit exceptionally long operational life and stable operating characteristics.

SUMMARY OF THE INVENTION

The illustrated embodiment of the present invention is directed to a system for sensing the position of a tape in a storage receptacle for storing a loop, or bight, of a tape. The tape is drawn into an open end of the receptacle by a vacuum established within the receptacle. Tape position sensors provide signals representative of the length of the tape loop within the receptacle. These sensors each have a pad of self-polarizing material having an inherent electrostatic field by virtue of molecular structure, processing, mounting and other factors. A leaf spring member is mounted with one end overlying the pad of material while the other free end overlies a port which provides an air path between the inside space of the receptacle and the vacuum source. The vacuum source induces an air flow across the end of a leaf spring of a sensor adjacent to an open port to produce a vibration of the leaf spring. This vibration produces an electrical signal in the leaf spring member indicative of an open port, and concomitantly, the absence of the tape at that port.

DETAILED DESCRIPTION

Figure 1:
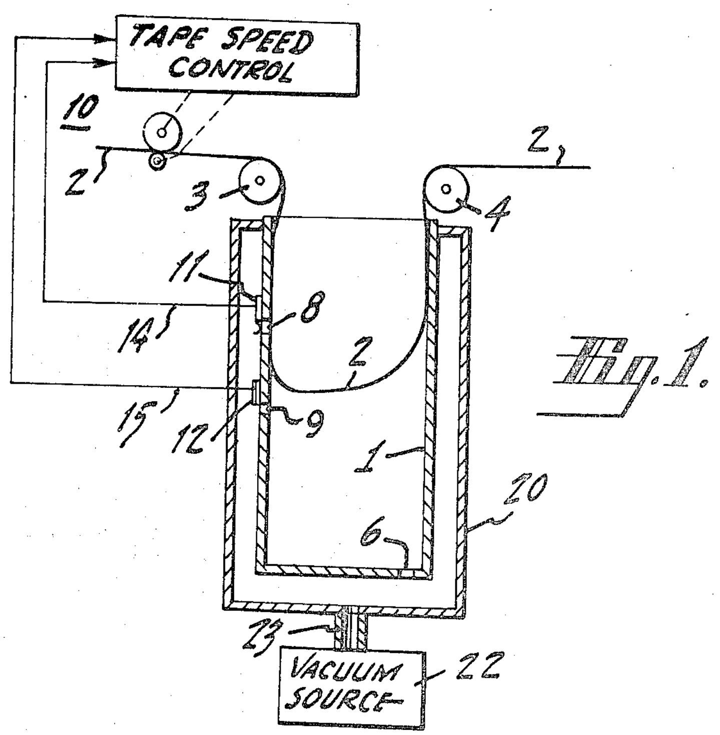
FIG. 1 is a cross-sectional view of an embodiment of the present invention in a tape storage apparatus.

In FIG. 1, there is shown a tape storage apparatus, embodying the present invention, having a tape loop receptacle 1 for storing a tape 2. The tape 2 is guided into the receptacle 1 by a pair of rollers 3, 4 located on respective sides of the receptacle 1 and spaced from the open end of the receptacle 1. The tape receptacle 1 has a primary vacuum hole, or port 6, in the bottom wall thereof. A pair of secondary vacuum apertures, or ports 8, 9 are located along one sidewall of the receptacle 1. The positions of the secondary openings 8, 9 are spaced from the open end of the receptacle 1 by respective distances corresponding to the minimum and maximum desired locations of the end of the tape bight with the receptacle 1, i.e., minimum and maximum lengths of tape. A pair of tape sensors 11, 12 more specifically discussed hereinafter, are located at respective ones of the secondary openings 8, 9. The sensors 11, 12 are connected by signal wires 14, 15, respectively, to suitable tape drive control means for controlling the length of the tape loop in the receptacle.

An outside cover 20 for the receptacle 1 covers the walls and bottom of the receptacle 1 and is spaced therefrom. The cover 20 is joined to receptacle 1 at the open end of the receptacle 1 to provide an airtight enclosure for the tape receptacle 1. A vacuum source 22 is connected to the space between the cover 20 and the receptacle 1 by a pipe 23.

The tape 2 is driven by a suitable tape drive means such as the capstan and pinch roller 10 into the receptacle 1 with the signals from the sensors 11, 12 being utilized to adjust the tape speed in any suitable manner well-known in the art whereby to maintain a desired tape loop length in the receptacle 1. Thus, when the lower end of the tape loop is detected at the lower source 12, the tape speed is decreased to prevent the loop from increasing beyond this point. Conversely, when the tape loop end is detected at the upper sensor 11, the speed of the tape 2 is increased to prevent the tape loop from shortening beyond this limit.

Figure 2:
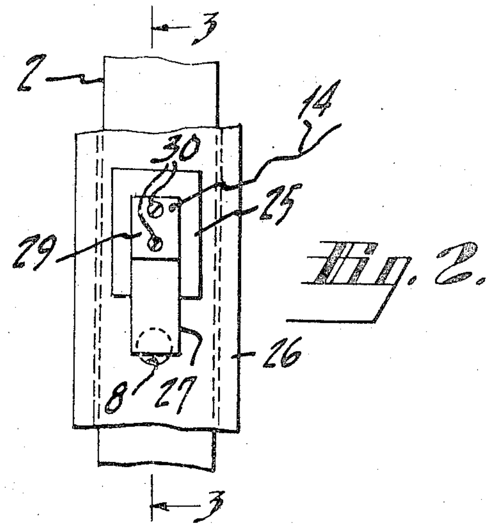
FIG. 2 is an enlarged partial front view of the embodiment of the invention shown in FIG. 1.
Figure 3:
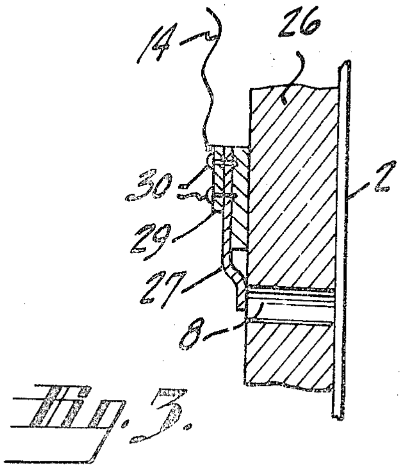
FIG. 3 is a cross-sectional side view of the apparatus shown in FIG. 2.

The structure of the sensors 11, 12 is shown in detail in FIGS. 2 and 3. A pad 25 of a suitable self-polarizing material, e.g., polytetrafluoroethylene, is held at one end against the wall 26 of the tape receptacle 1 by one end of a leaf spring 27 secured with a metal plate 29 and screws 30. The screws 30 pass through the pad 25 into electrically insulated mounts within the wall 26 of the tape receptacle 1. The other end of the pad 25 extends under the leaf spring 27 to a point adjacent to a secondary vacuum port, e.g., port 8. On the other hand, the other end of the leaf spring 27 is additionally overly extended to a major part of the port 8. A sensor signal wire, e.g., wire 14, is attached to the securing plate 29 which is electrically connected to the leaf spring 27.

In operation, the self-polarizing material of the pad 25 exhibits an electrostatic field by virtue of its normal physical characteristics. It has been found that an electrical signal is generated in an electrical conductor which is moved relative to the self-polarized material. This movement of the conductor produces a disturbance and interaction of the field of the self-polarized material and the conductor to induce a varying electrical signal in the conductor which signal is amplitude dependent on the separation of the conductor from the material and frequency dependent on the rate of vibration of the conductor. These electrical signals may be amplified and used to control the tape transport system using the present invention.

The aforesaid theory of operation is presented as being the one which is believed to best explain the operation of the sensor apparatus shown herein. Other possible explanations of the operation of the present invention have included one which attempts to explain the operation of the sensors 11, 12 by likening them to an electric microphone, such devices being well-known in the art. Accordingly, the inventor does not wish to be bound by any one explanation of the operation of the sensors 11, 12 since it may be that the operation thereof is actually a combination of several concurrent effects.

This electrostatic field may be augmented by a moderate tightening of the screws 30 which tend to compress the pad 25. A vibration of the leaf spring 27 is produced by air passing through the port 11 from the interior of the tape receptacle 1 on its way to the vacuum source 22. In other words, the reduced pressure in the space between the receptacle 1 and the cover 20 produced by the vacuum source 22 is effective to cause an airflow from the open end of the tape receptacle 1, past the edges of the tape 2 which are only in minimal contact with walls of the receptacle 1 across the width of the tape loop and into available ones of the ports 8, 9.

On the other hand, as the tape 2 is drawn into the tape receptacle 1 by the vacuum therein established by way of the primary port 6, the surface of the tape 2 is substantially in firm contact with the sidewalls of the receptacle 1 across the width of the tape 2. Thus, as the tape 2 moves down into the receptacle 1, it is effective to cover the secondary ports 8, 9 and to interrupt the aforesaid airflow, as illustrated in FIGS. 2 and 3. As the tape 2 passes over these ports 8, 9, it further seals them by virtue of the pressure differential from the outside surface of the tape 2 to the inside of the cover 20. This operation of the tape 2 terminates the vibration of the leaf springs 27 which, in turn, extinguishes the sensor signals on the connecting lines 14 and 15. Thus, the movement of the tape 2 controls the actuation of the sensors 11, 12 to signal to associated equipment the level of the tape loop within the tape receptacle 1.

The primary aperture 6 is large enough to maintain a slight pressure differential between the inside of the receptacle 1 and the inside of the cover 20 so that airflow will always occur through any secondary port uncovered by tape 2 whereby the corresponding sensor is actuated. However, this differential is maintained at a level which will not inhibit movement of the tape 2 along the inner wall of receptacle 1.

It should be noted that modifications of the illustrated structure are possible without departing from the scope of the invention. For example, for a more precise control of the tape level, more sensors and ports could be used to sense a plurality of levels, and they could advantageously be alternated on opposite walls of the receptacle 1. Further, the pad 25 could be extended the full length of the leaf 27, and fastened to the leaf 27. By making this full-length pad of thin material, it would flex with the leaf 27 to augment the electrical signal from the sensor by additional effects, e.g., piezo-electric. Finally, while the ports 8, 9 are shown as a single hole, they could be a plurality of smaller holes which would avoid any possibility of "-dimpling" the tape 2, i.e., creating a dimple in the tape.

I claim:

1. In combination, a plate formed with an aperture therein separating two chambers having a pressure differential therebetween, flow-sensing means located adjacent to said aperture and operative to generate an electrical signal representative of a flow through said aperture, said means including a self-polarized material and a resilient member operatively associated with said material and partially blocking said aperture to vibrate in s response to a flow through said aperture, said material being a pad mounted adjacent to said aperture and said resilient member being a leaf spring attached at one end to said pad and extending across said pad to a free end partially overlying said aperture.

2. A combination as set forth in claim 1, and including a member of variable length extending into the one of said chambers of higher pressure which member, when greater than a predetermined length, blocks said aperture.

3. A combination as set forth in claim 2, and including means responsive to said flow-sensing means for adjusting the length of said member of variable length.

4. A tape storage apparatus comprising an open ended storage receptacle, means to induce a movement of a tape into said receptacle, and tape position sensors arranged to sense the tape position in said receptacle, said sensors each including a self-polarized material having an inherent electrostatic field and resilient means operatively associated with said field and responsive to said tape position to produce an electrical signal representative of the tape position in said receptacle, said material being a pad mounted on said receptacle and said resilient means being a leaf spring having one end located on said pad and extending across said pad to a free end arranged to be moved in response to said tape in said receptacle.

5. A tape storage apparatus as set forth in claim 4, and including an aperture in said receptacle adjacent to said free end of said leaf spring and including a vacuum source connected to said aperture to induce a flow therethrough when the aperture is free of said tape.

6. A tape storage apparatus as set forth in claim 5, wherein said means for inducing a movement of a tape is a vacuum source connected to a closed end of said receptacle.